US012694612B2

(12) United States Patent
Liu et al.

(10) Patent No.: US 12,694,612 B2
(45) Date of Patent: Jul. 28, 2026

(54) METHOD AND APPARATUS FOR UPDATING TARGET DETECTION MODEL

(71) Applicant: Beijing Jingdong Qianshi Technology Co., Ltd., Beijing (CN)

(72) Inventors: Weifeng Liu, Beijing (CN); Jichang Shan, Beijing (CN); Jinlong Hu, Beijing (CN); Yunjian Cheng, Beijing (CN); Xu Liu, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 294 days.

(21) Appl. No.: 18/574,705

(22) PCT Filed: Jun. 17, 2022

(86) PCT No.: PCT/CN2022/099510
§ 371 (c)(1),
(2) Date: Dec. 27, 2023

(87) PCT Pub. No.: WO2023/020103
PCT Pub. Date: Feb. 23, 2023

(65) Prior Publication Data
US 2025/0037434 A1 Jan. 30, 2025

(30) Foreign Application Priority Data

Aug. 17, 2021 (CN) .......................... 202110957524.X

(51) Int. Cl.
*G06T 17/00* (2006.01)
*B25J 9/16* (2006.01)
(Continued)

(52) U.S. Cl.
CPC .......... *G06V 10/774* (2022.01); *B25J 9/1697* (2013.01); *G06T 11/60* (2013.01); *G06T 17/00* (2013.01)

(58) Field of Classification Search
CPC ...... G06V 10/774; G06V 10/82; G06V 20/52; G06V 20/64; B25J 9/1697; B25J 9/1687;
(Continued)

(56) References Cited

U.S. PATENT DOCUMENTS 10,909,349 B1 2/2021 Tripathi
12,100,224 B1* 9/2024 Goel ..................... G06N 3/0464
(Continued)

FOREIGN PATENT DOCUMENTS

CN 109061643 A 12/2018
CN 111931836 A 11/2020
(Continued)

OTHER PUBLICATIONS

Hoang et al., Object-RPE: Dense 3D Reconstruction and Pose Estimation with Convolutional Neural Networks for Warehouse Robots, 2019, European Conference on Mobile Robots, pp. 1-7. (Year: 2019).*
(Continued)

*Primary Examiner* — Kathleen M Broughton
(74) *Attorney, Agent, or Firm* — Nixon Peabody LLP

(57) ABSTRACT

Disclosed in the present disclosure are a method and apparatus for updating a target detection model. A specific implementation of the method comprises: constructing a three-dimensional model of a target article according to image data of the target article at a plurality of angles; generating, according to the three-dimensional model, a synthetic image comprising a target article object, which represents the target article; by taking the synthetic image as a sample image and taking the target article object as a label, obtaining training samples to generate a training sample set; and training a target detection model by means of the training sample set, so as to obtain an updated target detection model.

15 Claims, 7 Drawing Sheets

(51) Int. Cl.
  *G06T 11/60* (2006.01)
  *G06V 10/774* (2022.01)

(58) Field of Classification Search
  CPC ....... G06T 11/60; G06T 17/00; G06F 18/214;
    G06N 3/09; G06N 3/044; G06N 3/0464;
    G06N 20/00; G05B 2219/40006; G05B
    2219/40564; G05B 2219/45063
  See application file for complete search history.

(56) References Cited

U.S. PATENT DOCUMENTS

| | | | | |
|---|---|---|---|---|
| 2010/0004778 A1 | 1/2010 | Arimatsu | | |
| 2016/0005161 A1* | 1/2016 | Aiso | .................... | G06V 10/772 |
| | | | | 382/153 |
| 2020/0151488 A1 | 5/2020 | Kanata et al. | | |
| 2020/0372681 A1 | 11/2020 | Kado | | |
| 2021/0027103 A1 | 1/2021 | Brewer | | |
| 2021/0078170 A1 | 3/2021 | Jiang et al. | | |
| 2021/0270958 A1* | 9/2021 | Fang | ........................ | G01S 17/42 |
| 2022/0036579 A1* | 2/2022 | Liang | ......................... | G06T 7/70 |

FOREIGN PATENT DOCUMENTS

| | | |
|---|---|---|
| CN | 111932673 A | 11/2020 |
| CN | 112016630 A | 12/2020 |
| CN | 112287960 A | 1/2021 |
| CN | 112465960 A | 3/2021 |
| CN | 112651881 A | 4/2021 |
| CN | 112966742 A | 6/2021 |
| CN | 113610968 A | 11/2021 |
| JP | 2020080023 A | 5/2020 |
| JP | 2020190950 A | 11/2020 |
| JP | 2020197978 A | 12/2020 |
| JP | 2021045811 A | 3/2021 |
| WO | WO 2020000879 A1 | 1/2020 |

OTHER PUBLICATIONS

Lin et al., Robotic Grasping with Multi-View Image Acquisition and Model-Based Prose Estimation, 2020, IEEE Sensors 21(10):11870-11878. (Year: 2020).*

Liang, Yongchun et al., "Personnel Search Mechanism and Analysis of Real-Time Based on Aerial Image" Journal of North China Institute of Science and Technology, vol. 7, No. 2, Apr. 2020 (8 pages) [Translation of Abstract Provided].

Pepik, Bojan et al., "Multi-view and 3D Deformable Part Models" IEEE transactions on pattern analysis and machine intelligence, 2015 (14 pages).

Wang, Zhiheng et al., "Object Detection and Locating Based on Semantic Segmentation for Picking System" Metrology and Testing Technology, vol. 45, No. 4, 2018 (4 pages) [Translation of Abstract Provided].

China National Intellectual Property Administration; International Search Report of International Searching Authority for International Patent Application No. PCT/CN2022/099510, mailed Sep. 14, 2022, with English language translation (4 pages).

Wang et al. "Design of a voice control 6DoF grasping robotic arm based on ultrasonic sensor, computer vision and Alexa voice assistance." 2019 10th International Conference on Information Technology in Medicine and Education (ITME), IEEE, 6 Pages (2019).

Extended European Search Report Issued in EP Application No. 22857416.6, dated Mar. 6, 2025 (8 Pages).

* cited by examiner

100

102

101

103

105

104

106

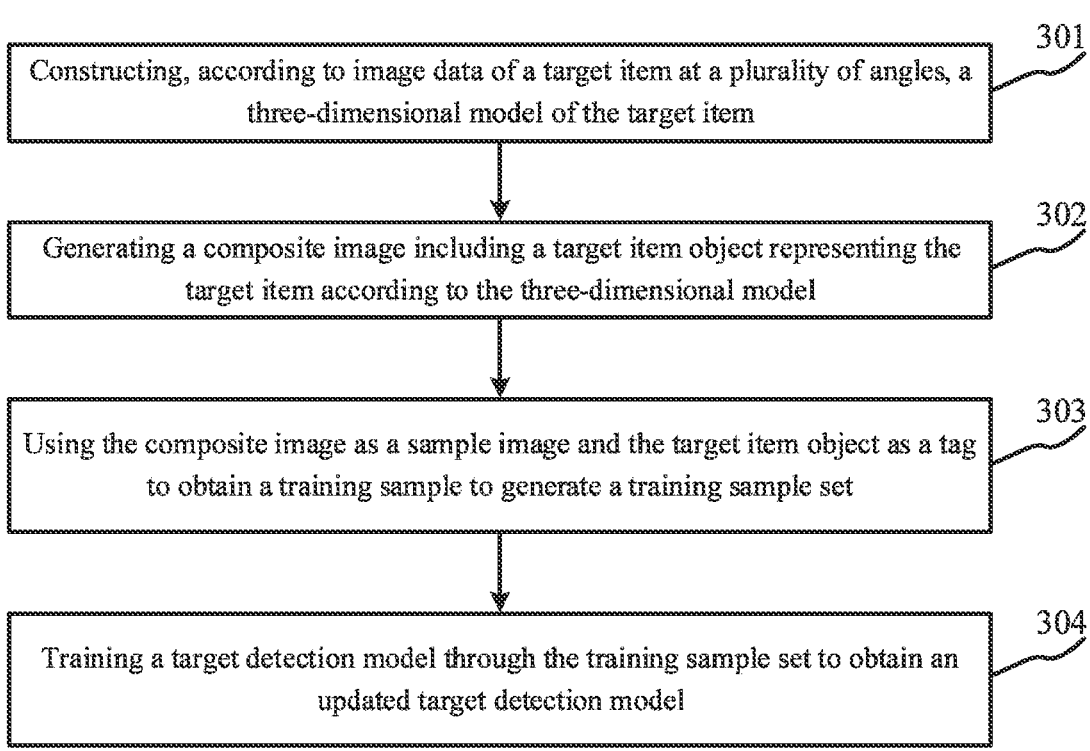

300

301

Constructing, according to image data of a target item at a plurality of angles, a three-dimensional model of the target item

302

Generating a composite image including a target item object representing the target item according to the three-dimensional model

303

Using the composite image as a sample image and the target item object as a tag to obtain a training sample to generate a training sample set

304

Training a target detection model through the training sample set to obtain an updated target detection model

Fig. 3

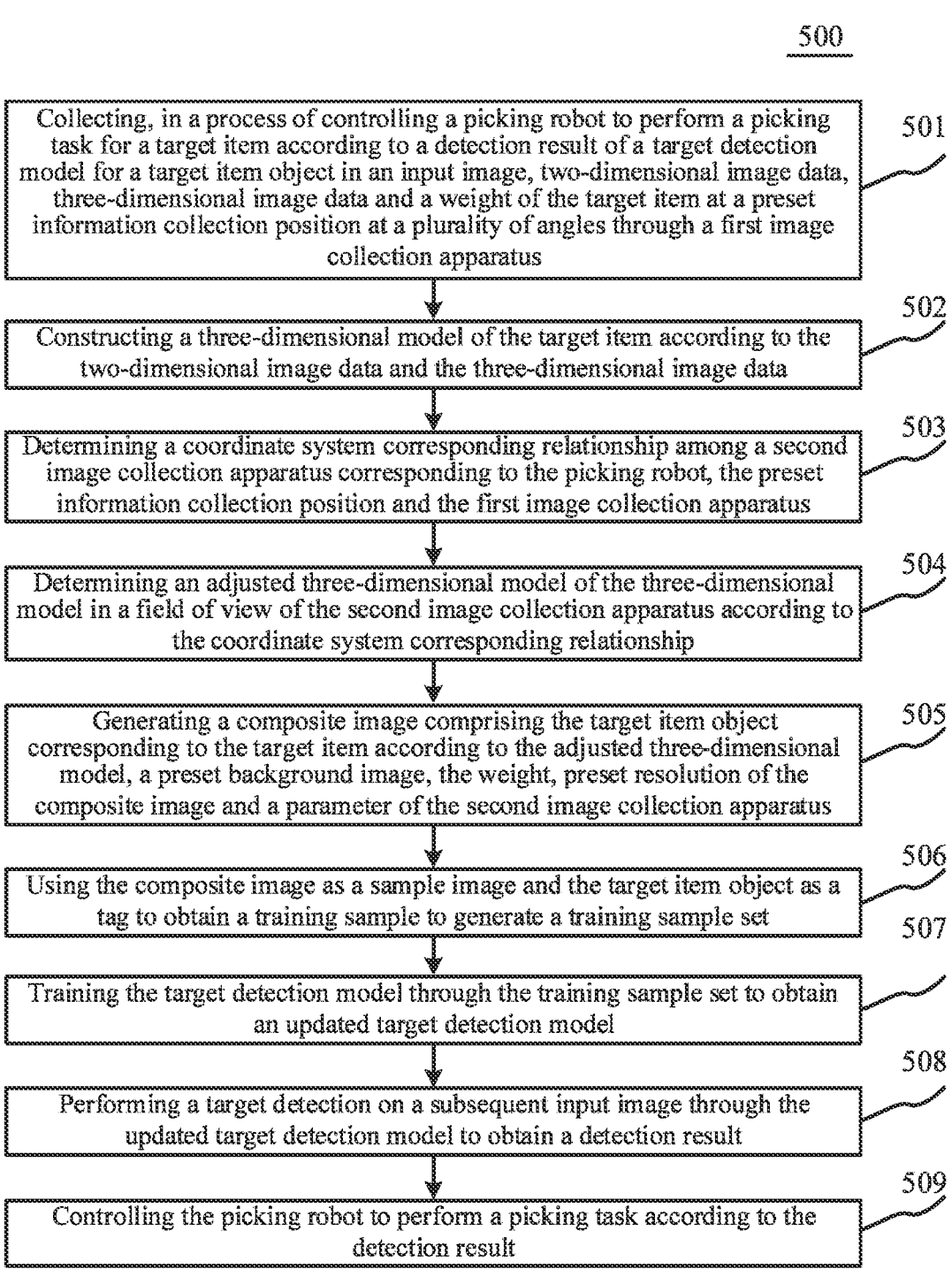

<u>500</u>

Collecting, in a process of controlling a picking robot to perform a picking task for a target item according to a detection result of a target detection model for a target item object in an input image, two-dimensional image data, three-dimensional image data and a weight of the target item at a preset information collection position at a plurality of angles through a first image collection apparatus — 501

Constructing a three-dimensional model of the target item according to the two-dimensional image data and the three-dimensional image data — 502

Determining a coordinate system corresponding relationship among a second image collection apparatus corresponding to the picking robot, the preset information collection position and the first image collection apparatus — 503

Determining an adjusted three-dimensional model of the three-dimensional model in a field of view of the second image collection apparatus according to the coordinate system corresponding relationship — 504

Generating a composite image comprising the target item object corresponding to the target item according to the adjusted three-dimensional model, a preset background image, the weight, preset resolution of the composite image and a parameter of the second image collection apparatus — 505

Using the composite image as a sample image and the target item object as a tag to obtain a training sample to generate a training sample set — 506

Training the target detection model through the training sample set to obtain an updated target detection model — 507

Performing a target detection on a subsequent input image through the updated target detection model to obtain a detection result — 508

Controlling the picking robot to perform a picking task according to the detection result — 509

Fig. 5

METHOD AND APPARATUS FOR UPDATING TARGET DETECTION MODEL

CROSS-REFERENCE TO RELATED APPLICATIONS

This patent application is a U.S. National Stage of International Application No. PCT/CN2022/099510, filed on Jun. 17, 2022, which claims the benefit of and priority to Chinese Patent Application No. 202110957524.X, filed on Aug. 17, 2021, entitled "Method and Apparatus for Updating Target Detection Model," each of which is hereby incorporated by reference herein in its entirety.

TECHNICAL FIELD

Embodiments of the present disclosure relate to the field of computer technology, and specifically to a method and apparatus for updating a target detection model.

BACKGROUND

In the field of intelligent warehousing automation, the way in which a picking robot performs a picking task has good application prospects. The picking robot performs the picking task refers to that the picking robot picks a target item to a designated position on the basis of visual guidance. High-precision target detection is the core technical foundation of this application scenario. The target detection technology based on deep learning is currently a relatively practical technology.

SUMMARY

Embodiments of the present disclosure propose a method and apparatus for updating a target detection model.

In a first aspect, an embodiment of the present disclosure provides a method for updating a target detection model, including: constructing, according to image data of a target item at a plurality of angles, a three-dimensional model of the target item; generating a composite image including a target item object representing the target item according to the three-dimensional model; using the composite image as a sample image and the target item object as a tag to obtain a training sample to generate a training sample set; and training the target detection model through the training sample set to obtain an updated target detection model, where the target detection model is used to represent a corresponding relationship between an input image and a detection result corresponding to the target item object in the input image.

In some embodiments, the constructing, according to image data of a target item at a plurality of angles, a three-dimensional model of the target item includes: collecting, in a process of controlling a picking robot to perform a picking task for the target item according to the detection result of the target detection model for the target item object in the input image, two-dimensional image data and three-dimensional image data of the target item at a preset information collection position at the plurality of angles through a first image collection apparatus; and constructing the three-dimensional model of the target item according to the two-dimensional image data and the three-dimensional image data.

In some embodiments, the generating a composite image including a target item object representing the target item according to the three-dimensional model includes: determining a coordinate system corresponding relationship among a second image collection apparatus corresponding to the picking robot, the preset information collection position and the first image collection apparatus; determining an adjusted three-dimensional model of the three-dimensional model in a field of view of the second image collection apparatus according to the coordinate system corresponding relationship; and generating the composite image including the target item object corresponding to the target item according to the adjusted three-dimensional model and a preset background image representing a picking scenario of the picking robot.

In some embodiments, the method further includes: determining a weight of the target item, and the generating the composite image including the target item object corresponding to the target item according to the adjusted three-dimensional model and a preset background image representing a picking scenario of the picking robot includes: generating the composite image including the target item object corresponding to the target item according to the adjusted three-dimensional model, the preset background image, the weight, preset resolution of the composite image and a parameter of the second image collection apparatus.

In some embodiments, the training the target detection model through the training sample set to obtain an updated target detection model includes: using a machine learning algorithm to train the target detection model through the training sample set to obtain the updated target detection model, in response to determining that a detection precision of the target detection model is less than a preset threshold.

In some embodiments, the method further includes: performing a target detection on a subsequent input image through the updated target detection model to obtain a detection result; and controlling the picking robot to perform a picking task according to the detection result.

In a second aspect, an embodiment of the present disclosure provides an apparatus for updating a target detection model, including: a constructing unit, configured to construct, according to image data of a target item at a plurality of angles, a three-dimensional model of the target item; an image generating unit, configured to generate a composite image including a target item object representing the target item according to the three-dimensional model; a sample generating unit, configured to use the composite image as a sample image and the target item object as a tag to obtain a training sample to generate a training sample set; and an updating unit, configured to train the target detection model through the training sample set to obtain an updated target detection model, where the target detection model is used to represent a corresponding relationship between an input image and a detection result corresponding to the target item object in the input image.

In some embodiments, the constructing unit is further configured to: collect, in a process of controlling a picking robot to perform a picking task for the target item according to the detection result of the target detection model for the target item object in the input image, two-dimensional image data and three-dimensional image data of the target item at a preset information collection position at the plurality of angles through a first image collection apparatus; and construct the three-dimensional model of the target item according to the two-dimensional image data and the three-dimensional image data.

In some embodiments, the image generating unit is further configured to: determine a coordinate system corresponding relationship among a second image collection apparatus corresponding to the picking robot, the preset information collection position and the first image collection apparatus; determine an adjusted three-dimensional model of the three-dimensional model in a field of view of the second image collection apparatus according to the coordinate system corresponding relationship; and generate the composite image including the target item object corresponding to the target item according to the adjusted three-dimensional model and a preset background image representing a picking scenario of the picking robot.

In some embodiments, the apparatus further includes: a determining unit, configured to determine a weight of the target item, and the image generating unit is further configured to: generate the composite image including the target item object corresponding to the target item according to the adjusted three-dimensional model, the preset background image, the weight, preset resolution of the composite image and a parameter of the second image collection apparatus.

In some embodiments, the updating unit is further configured to: use a machine learning algorithm to train the target detection model through the training sample set to obtain the updated target detection model, in response to determining that a detection precision of the target detection model is less than a preset threshold.

In some embodiments, the apparatus further includes: an obtaining unit, configured to perform a target detection on a subsequent input image through the updated target detection model to obtain a detection result; and a performing unit, configured to control the picking robot to perform a picking task according to the detection result.

In a third aspect, an embodiment of the present disclosure provides a computer readable medium, storing a computer program. The program, when executed by a processor, implements the method according to any implementation in the first aspect.

In a fourth aspect, an embodiment of the present disclosure provides an electronic device, including: one or more processors; and a storage apparatus, storing one or more programs. The one or more programs, when executed by the one or more processors, cause the one or more processors to implement the method according to any implementation in the first aspect.

In a fifth aspect, an embodiment of the present disclosure provides a computer program product, including a computer program. The computer program, when executed by a processor, implements the method according to any implementation in the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent.

FIG. 3 is a flowchart of an embodiment of a method for updating a target detection model according to the present disclosure;

4

Figure 6:
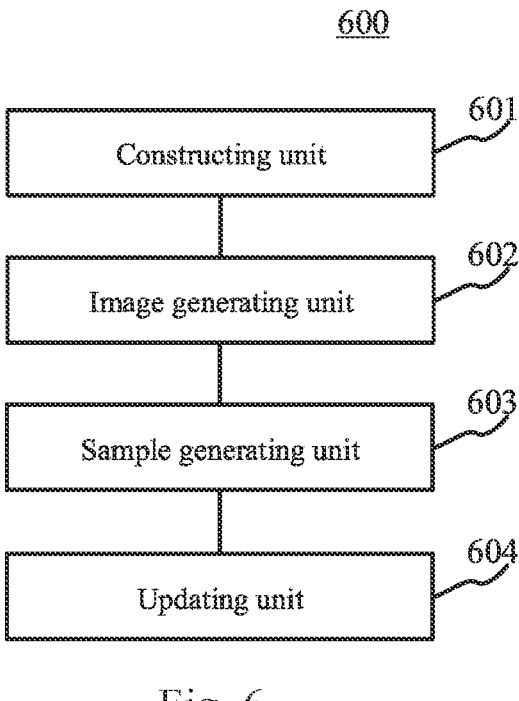
Figure 7:
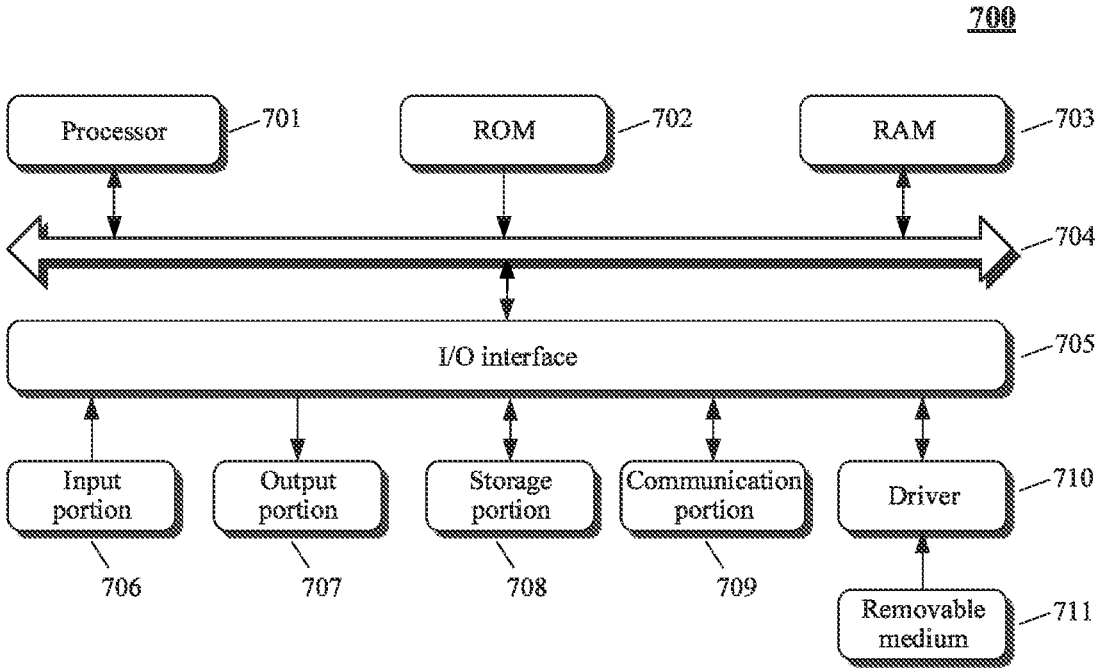

FIG. 5 is a flowchart of another embodiment of the method for updating a target detection model according to the present disclosure;

FIG. 6 is a structural diagram of an embodiment of an apparatus for updating a target detection model according to the present disclosure; and FIG. 7 is a schematic structural diagram of a computer system adapted to implement embodiments of the present disclosure.

DETAILED DESCRIPTION OF EMBODIMENTS

The present disclosure is further described below in detail by combining the accompanying drawings and the embodiments. It may be appreciated that the specific embodiments described herein are merely used for explaining the relevant disclosure, rather than limiting the disclosure. In addition, it should be noted that, for ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
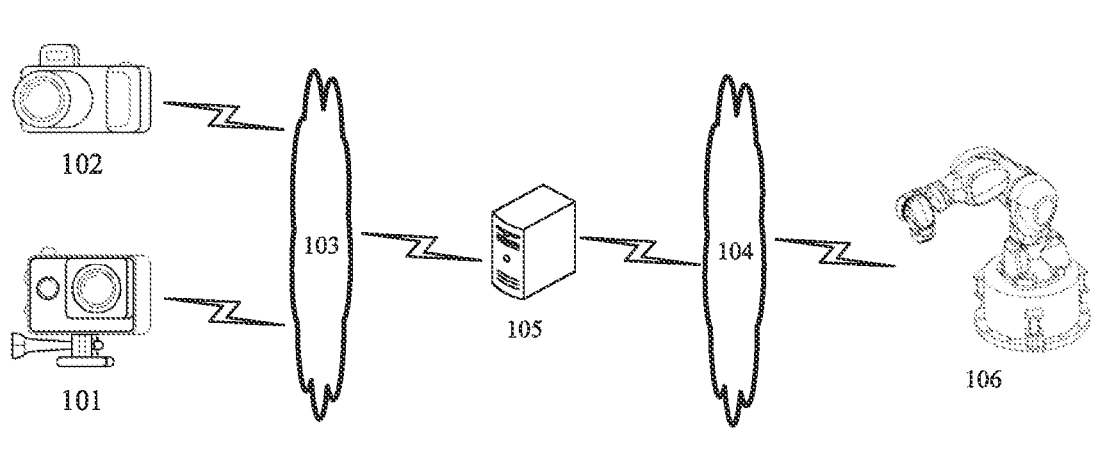
FIG. 1 is a diagram of an exemplary system architecture in which an embodiment of the present disclosure may be applied.

FIG. 1 illustrates an exemplary system architecture 100 in which a method and apparatus for updating a target detection model according to the present disclosure may be applied.

As shown in FIG. 1, the system architecture 100 may include image collection apparatuses 101 and 102, networks 103 and 104, a control apparatus 105 and a picking robot 106. The communication connections among the image collection apparatuses 101 and 102, the control apparatus 105 and the picking robot 106 constitute a topological network. The networks 103 and 104 serve as media providing communication links between the image collection apparatuses 101 and 102, the control apparatus 105 and the picking robot 106. The networks 103 and 104 may include various types of connections, for example, wired or wireless communication links, or optical fiber cables.

The image collection apparatuses 101 and 102 may be hardware devices or software having a 2D image collection function, a 3D image collection function and an information transmission function. When the image collection apparatuses 101 and 102 are, they may be various electronic devices supporting a network connection and functions such as image acquisition, interaction, display and processing functions, the electronic devices including, but not limited to, a 2D camera, a 3D camera, a smartphone, a tablet computer, a desktop computer, and the like. When the image collection apparatuses 101 and 102 are the software, they may be installed in the above electronic devices. The image collection apparatuses 101 and 102 may be implemented as a plurality of pieces of software or a plurality of software modules (e.g., software or software modules for providing a distributed service), or as a single piece of software or a single software module, which will not be specifically limited here.

The control apparatus 105 may be a server providing various services, for example, a server that automatically generates training data and automatically updates a target detection model in the process of controlling a picking robot to perform a picking task according to the detection result of the target detection model for a target item in a to-be-detected image. As an example, the control apparatus 105 may be a cloud server. Specifically, the control apparatus

105 obtains the detection result of the target item in the to-be-detected image through the target detection model and controls the picking robot to perform the picking task according to the detection result; and acquires the image data of the picked target item at a plurality of angles when the picking robot performs the picking task, to construct the three-dimensional model of the target item to obtain training data, thereby updating the target detection model through the training data.

It should be noted that the control apparatus may be hardware or software. When the control apparatus is the hardware, it may be implemented as a distributed server cluster composed of a plurality of servers, or as a single server. When the control apparatus is the software, it may be implemented as a plurality of pieces of software or a plurality of software modules (e.g., software or software modules for providing a distributed service), or as a single piece of software or a single software module, which will not be specifically limited here.

The picking robot may be various robots having a picking function, for example, a multi-degree-of-freedom mechanical arm.

According to the method and apparatus for updating a target detection model provided in the embodiments of the present disclosure, the three-dimensional model of the target item is constructed according to the image data of the target item at the plurality of angles; the composite image including the target item object representing the target item is generated according to the three-dimensional model; the composite image is used as a sample image and the target item object is used as a tag to obtain a training sample to generate a training sample set; and the target detection model is trained through the training sample set to obtain an updated target detection model. Accordingly, a method of automatically generating the training data and automatically updating the target detection model is provided, thereby improving the convenience of updating the target detection model and the accuracy of the detection result.

Figure 2:
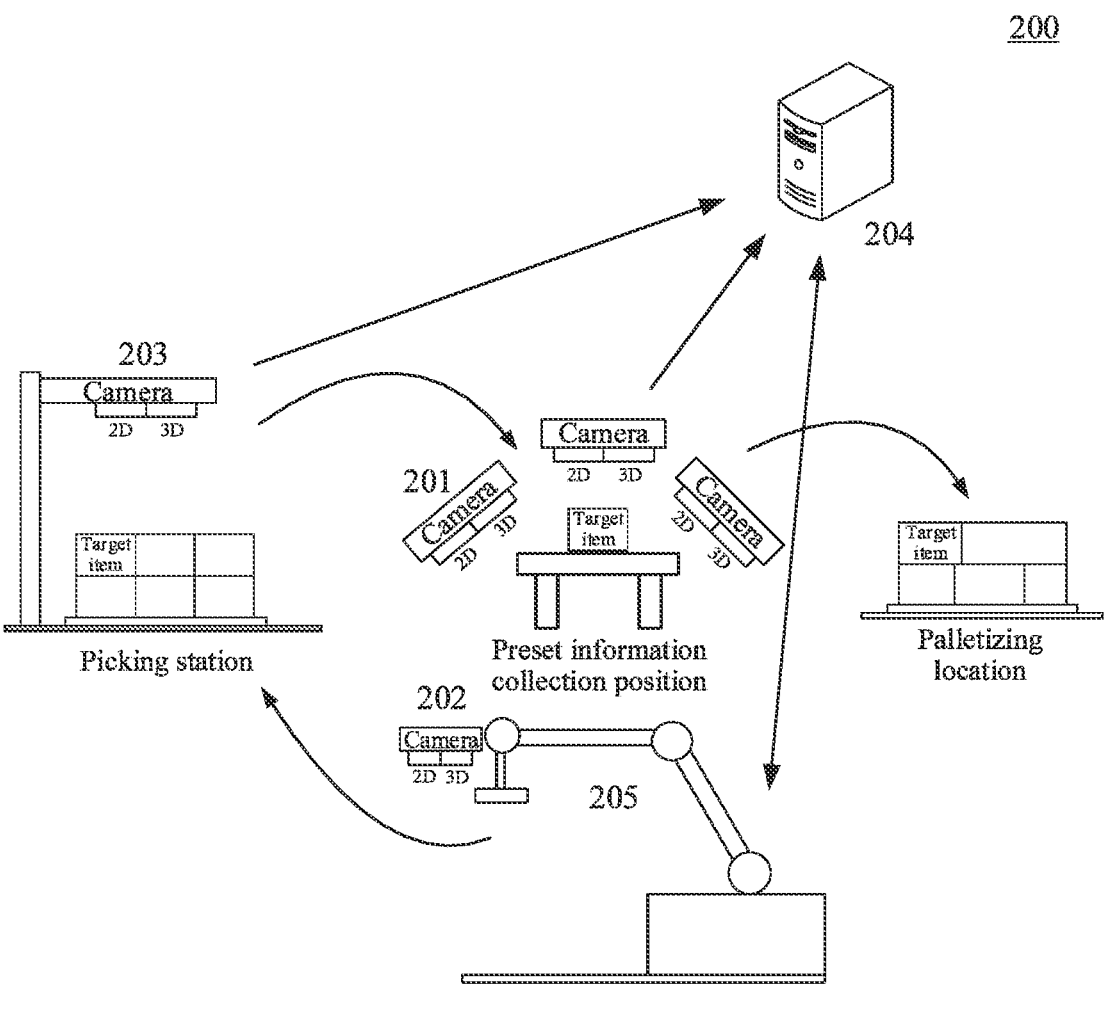
FIG. 2 is a diagram of another exemplary system architecture in which an embodiment of the present disclosure may be applied.

As shown in FIG. 2, FIG. 2 illustrates another exemplary architecture 200 of a system for updating a target detection model. The architecture 200 includes a first image collection apparatus 201, a second image collection apparatus 202, a third image collection apparatus 203, a control apparatus 204 and a picking robot 205.

The third image collection apparatus 203 is disposed at a picking station where a turnover box containing a to-be-picked target item is placed. The third image collection apparatus 203 is used to collect an image including the target object corresponding to the target item in the turnover box. The control apparatus 204 is used to use the image collected by the third image collection apparatus 203 as an input image of a target detection model to obtain a detection result, and then control a picking robot to perform a picking task (transferring the target item from the picking station to a palletizing location) according to the detection result.

The second image collection apparatus 202 is disposed correspondingly on the picking robot. The first image collection apparatus 201 is disposed at a preset information collection position. The preset information collection position may be any position by which the picking robot passes when picking the target item to move. For example, the preset position is set close to the picking station where the to-be-picked target item is placed. The first image collection apparatus 201 is used to acquire the image data of the target item at a plurality of angles in response to determining that the picking robot picks the target item and moves to the preset information collection position, when the picking robot picks the target item from the picking station to the palletizing location. The control apparatus 204 is further used to construct the three-dimensional model of the target item according to the image data of the target item at the plurality of angles, to generate training data to update the target detection model.

The method for updating a target detection model provided in the embodiments of the present disclosure may be performed by the control apparatus, and correspondingly, the parts (e.g., the units) included in the apparatus for updating a target detection model may be all provided in the control apparatus.

It should be appreciated that the numbers of the image collection apparatuses, the networks, the control apparatus and the picking robots in FIG. 1 are merely illustrative. Any number of image collection apparatuses, networks, control apparatus and picking robots may be provided based on actual requirements. When an electronic device on which the method for updating a target detection model runs does not need to perform data transmission with other electronic devices, the system architecture may only include the electronic device (e.g., the control apparatus) on which the method for updating a target detection model runs.

Further referring to FIG. 3, FIG. 3 illustrates a flow 300 of an embodiment of a method for updating a target detection model, including the following steps.

Step 301, constructing, according to image data of a target item at a plurality of angles, a three-dimensional model of the target item.

In this embodiment, an executing body (e.g., the terminal device or server shown in FIG. 1) of the method for updating a target detection model may remotely or locally acquire the image data of the target item at the plurality of angles through a wired connection network or a wireless connection network, and then construct the three-dimensional model of the target item according to the image data of the target item at the plurality of angles.

The target detection model is used to represent a corresponding relationship between an input image and a detection result corresponding to a target item object in the input image, and can be trained and obtained based on a neural network model having a target item detection function, the neural network including, but not limited to, a convolutional neural network, a residual neural network and a recurrent neural network. It should be noted that the target detection model is a model that is trained in advance and already applied to a picking scenario.

By inputting a to-be-detected image into the target detection model, a detection box indicating the target item in the to-be-detected image can be determined. Then, the position information of the target item at a picking station in the realistic environment is determined according to the calibration information of the image collection apparatus (the third image collection apparatus 203 in FIG. 2) acquiring the to-be-detected image. Accordingly, a picking robot may be controlled to pick the target item at the position represented by the determined position information.

Here, the target item may be various physical objects. As an example, the target item is various commodities.

The image data includes 2D (2-dimensional) image data and 3D image data. As an example, the 2D image data is an RGB (red, green and blue) image, and the 3D image data is point cloud image data.

In this embodiment, it is possible to obtain the image data of the target item at the plurality of angles by photographing the target item through a plurality of groups of cameras at different positions. Here, each group of cameras includes a 2D camera and a 3D camera.

In this embodiment, the above executing body may input the image data of the target item at the plurality of angles into an existing network model (e.g., Reality Capture released by Capturing Reality Company) for 3D modeling, thus obtaining the three-dimensional model of the target item.

In some alternative implementations of this embodiment, the above executing body may perform step 301 by: first collecting, in a process of controlling the picking robot to perform a picking task for the target item according to the detection result of the target detection model for the target item object in the input image, two-dimensional image data and three-dimensional image data of the target item at a preset information collection position at the plurality of angles through a first image collection apparatus; and then constructing the three-dimensional model of the target item according to the two-dimensional image data and the three-dimensional image data.

Specifically, the preset information collection position is set between the picking station and a palletizing location, and the first image collection apparatus including a plurality of groups of cameras is disposed around the preset information collection position. When the picking robot picks the target item at the picking station according to the detection result of the target detection model to move to the palletizing location, the picking robot temporarily places the target item at the preset information collection position in response to arriving at the preset information collection position, for the first image collection apparatus to obtain the two-dimensional image data and three-dimensional image data of the target item at the plurality of angles.

Step 302, generating a composite image including a target item object representing the target item according to the three-dimensional model.

In this embodiment, the above executing body may generate the composite image including the target item object representing the target item according to the three-dimensional model.

As an example, the above executing body inputs the three-dimensional model of the target item into an image composition tool (e.g., Keyshot) and sets a background image for the three-dimensional model to obtain the composite image. Specifically, a plurality of composite images may be generated for the three-dimensional model of the same target item based on different angles and/or different background images of the three-dimensional model.

In order to obtain a more realistic composite image to make the target detection model updated using the training data obtained based on the composite image more suitable for the real scenario of a picking robot workstation as shown in FIG. 2, in some alternative implementations of this embodiment, the above executing body may perform step 302 through the following approach.

First, a coordinate system corresponding relationship among a second image collection apparatus corresponding to the picking robot, the preset information collection position and the first image collection apparatus is determined.

The second image collection apparatus, the preset information collection position and the first image collection apparatus are sequentially provided with a corresponding coordinate system. The above executing body may determine the coordinate system corresponding relationship among the second image collection apparatus corresponding to the picking robot, the preset information collection position and the first image collection apparatus through a calibration algorithm.

Second, an adjusted three-dimensional model of the three-dimensional model in a field of view of the second image collection apparatus is determined according to the coordinate system corresponding relationship.

The three-dimensional model is adjusted to be in the field of view of the second image collection apparatus corresponding to the picking robot, to fully fit with the real scenario of the picking robot workstation.

Third, the composite image including the target item object corresponding to the target item is generated according to the adjusted three-dimensional model and a preset background image representing a picking scenario of the picking robot.

As an example, the target item at the picking station is generally placed in a turnover box, and the preset background image may be a background image including a turnover box object corresponding to an empty turnover box. Accordingly, the authenticity of the composite image can be further improved.

In some alternative implementations of this embodiment, the above executing body may further determine the weight of the target item. As an example, a weight sensor is disposed at the preset information collection position to acquire the weight of the target item.

In this implementation, the above executing body may perform the third step by: generating the composite image including the target item object corresponding to the target item according to the adjusted three-dimensional model, the preset background image, the weight, preset resolution of the composite image and a parameter of the second image collection apparatus.

Here, the preset resolution is used to represent the desired resolution of the composite image, and the parameter of the second image collection apparatus represents the intrinsic parameter data thereof.

Specifically, the above executing body input data such as the adjusted three-dimensional model, the preset background image, the weight, the preset resolution of the composite image and the parameter of the second image collection apparatus as input data into a virtual physical engine tool (e.g., pybullet) to obtain the composite image.

It should be noted that the generated composite image may include a plurality of target item objects of the same kind, or may include a plurality of target item objects of different kinds. As an example, different kinds of target items may be many kinds of target items that are picked so far. In the process of picking the target items, the above executing body obtains the adjusted three-dimensional model and weight information of each kind of target item. A composite image including a plurality of target item objects of different kinds can be obtained through the virtual physical engine tool, to train and obtain a target detection model with a higher detection precision through the training data composed of the composite image.

Step 303, using the composite image as a sample image and the target item object as a tag to obtain a training sample to generate a training sample set.

In this embodiment, the executing body may use the composite image as the sample image and the target item object as the tag to obtain the training sample to generate the training sample set.

The composite image is combined according to the three-dimensional model, and the target item object in the composite image can be naturally obtained, thereby avoiding the manual annotation process for the tag. Accordingly, the training sample set for updating the target detection model can be expanded.

Step 304, training a target detection model through the training sample set to obtain an updated target detection model.

In this embodiment, the above executing body may train the target detection model through the training sample set to obtain the updated target detection model.

Specifically, first, an untrained training sample is selected from the training sample set, a sample image in the selected training sample is inputted into the target detection model, and the tag corresponding to the inputted training sample is used as a desired output to obtain an actual output of the target detection model. Then, the loss between the actual output and the tag is calculated. Finally, a gradient is calculated according to the loss, and the parameter of the target detection model is updated based on a gradient descent method and a random gradient descent method.

The above executing body may recurrently perform the above update process until a preset end condition is obtained, thereby obtaining the updated target detection model. Here, the preset end condition may be, for example, a number of times of training exceeds a preset number threshold, training time exceeds a preset time threshold, and the loss tends to be convergent.

In some alternative implementations of this embodiment, the above executing body may perform the above step 304 by: using a machine learning algorithm to train the target detection model through the training sample set to obtain the updated target detection model, in response to determining that a detection precision of the target detection model is less than a preset threshold.

Here, the preset threshold may be specifically set according to actual conditions. As an example, when the detection precision required by the pick task is high, a high preset threshold can be set; and when the detection precision required by the picking task is not high, a low preset threshold can be set.

As an example, the above executing body may input the composite image into an un-updated target detection model to obtain a detection box of a target object that is actually outputted by the target detection model; and then determine the IoU (Intersection-over-Union) between the actually outputted detection box and the detection box corresponding to the tag, to average the IoUs corresponding to the plurality of composite images, thereby determining the detection precision of the target detection model.

In some alternative implementations of this embodiment, after obtaining the updated target detection model, the above executing body performs a target detection on a subsequent input image through the updated target detection model to obtain a detection result, and controls a picking robot to perform the picking task according to the detection result.

Figure 4:
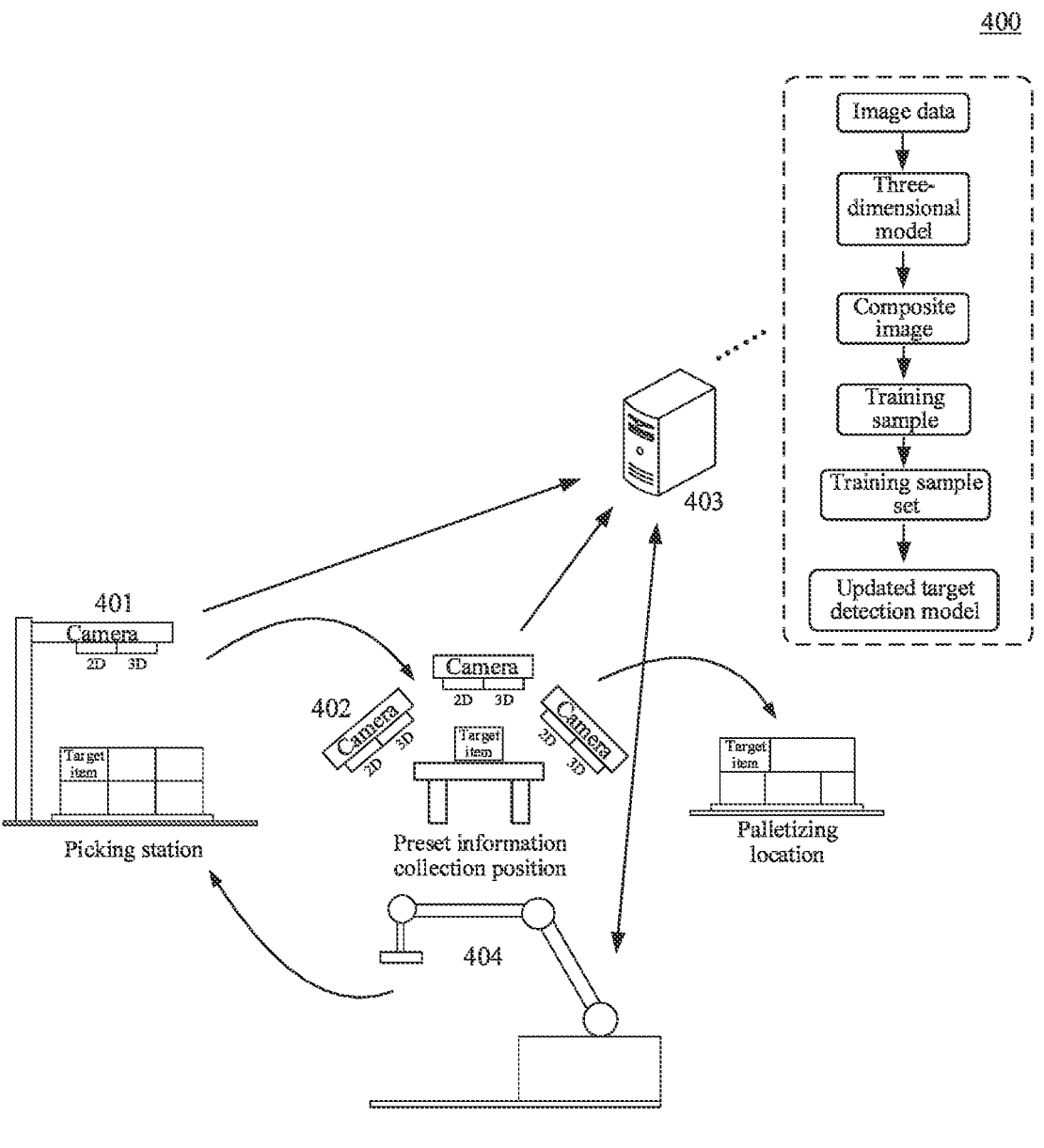
FIG. 4 is a schematic diagram of an application scenario of the method for updating a target detection model according to this embodiment.

Further referring to FIG. 4, FIG. 4 is a schematic diagram 400 of an application scenario of the method for updating a target detection model according to this embodiment. In the application scenario of FIG. 4, an image collection apparatus 401, an image collection apparatus 402, a server 403 and a picking robot 404 are included, the server 403 being provided with a target detection model. The image collection apparatus 401 is disposed at a picking station to photograph a target item at the picking station to obtain a to-be-detected image. A target detection is performed through the target detection model to obtain a detection result. Accordingly, the picking robot is controlled to pick the target item and move the target item to a palletizing location. When the picking robot performs a picking task for the target item, the image data of the target item at the preset information collection position at a plurality of angles is collected through the image collection apparatus 402. After obtaining the image data at the plurality of angles, the server first constructs a three-dimensional model of the target item according to the image data of the target item at the plurality of angles; then generates a composite image including a target item object representing the target item according to the three-dimensional model; uses the composite image as a sample image and the target item object as a tag to obtain a training sample to generate a training sample set; and then trains the target detection model through the training sample set to obtain an updated target detection model.

According to the method provided in the above embodiment of the present disclosure, the three-dimensional model of the target item is constructed according to the image data of the target item at the plurality of angles; the composite image including the target item object representing the target item is generated according to the three-dimensional model; the composite image is used as the sample image and the target item object is used as the tag to obtain the training sample to generate the training sample set; and the target detection model is trained through the training sample set to obtain the updated target detection model. Accordingly, a method of automatically generating the training data and automatically updating the target detection model is provided, thereby improving the convenience of updating the target detection model and the accuracy of the detection result.

Further referring to FIG. 5, FIG. 5 illustrates a schematic flow 500 of an embodiment of the method for updating a target detection model according to the present disclosure, including the following steps.

Step 501, collecting, in a process of controlling a picking robot to perform a picking task for a target item according to a detection result of a target detection model for a target item object in an input image, two-dimensional image data, three-dimensional image data and a weight of the target item at a preset information collection position at a plurality of angles through a first image collection apparatus.

Step 502, constructing a three-dimensional model of the target item according to the two-dimensional image data and the three-dimensional image data.

Step 503, determining a coordinate system corresponding relationship among a second image collection apparatus corresponding to the picking robot, the preset information collection position and the first image collection apparatus.

Step 504, determining an adjusted three-dimensional model of the three-dimensional model in a field of view of the second image collection apparatus according to the coordinate system corresponding relationship.

Step 505, generating a composite image including the target item object corresponding to the target item according to the adjusted three-dimensional model, a preset background image, the weight, preset resolution of the composite image and a parameter of the second image collection apparatus.

Step 506, using the composite image as a sample image and the target item object as a tag to obtain a training sample to generate a training sample set.

Step 507, training the target detection model through the training sample set to obtain an updated target detection model.

Here, the target detection model is used to represent a corresponding relationship between an input image and a detection result corresponding to the target item object in the input image.

Step 508, performing a target detection on a subsequent input image through the updated target detection model to obtain a detection result.

Step 509, controlling the picking robot to perform a picking task according to the detection result.

It can be seen from this embodiment, as compared with the embodiment corresponding to FIG. 3, the flow 500 of the updating method for updating a target detection model in this embodiment specifically describes the construction process of the composite image and the application process of the updated target detection model, and provides a closed-loop continuous learning method for the target detection model. In the method, the training sample set is constructed based on the three-dimensional model of the target item. Accordingly, the method is applicable to the target items of all shapes, thereby improving the universality and detection precision of the target detection model.

Further referring to FIG. 6, as an implementation of the method shown in the above drawings, the present disclosure provides an embodiment of an apparatus for updating a target detection model. The embodiment of the apparatus corresponds to the embodiment of the method shown in FIG. 3. The apparatus may be applied in various electronic devices.

As shown in FIG. 6, the apparatus for updating a target detection model includes: a constructing unit 601, configured to construct, according to image data of a target item at a plurality of angles, a three-dimensional model of the target item; an image generating unit 602, configured to generate a composite image including a target item object representing the target item according to the three-dimensional model; a sample generating unit 603, configured to use the composite image as a sample image and the target item object as a tag to obtain a training sample to generate a training sample set; and an updating unit 604, configured to train a target detection model through the training sample set to obtain an updated target detection model. Here, the target detection model is used to represent a corresponding relationship between an input image and a detection result corresponding to the target item object in the input image.

In some alternative implementations of this embodiment, the constructing unit 601 is further configured to collect, in a process of controlling a picking robot to perform a picking task for the target item according to the detection result of the target detection model for the target item object in the input image, two-dimensional image data and three-dimensional image data of the target item at a preset information collection position at the plurality of angles through a first image collection apparatus; and construct the three-dimensional model of the target item according to the two-dimensional image data and the three-dimensional image data.

In some alternative implementations of this embodiment, the image generating unit 602 is further configured to determine a coordinate system corresponding relationship among a second image collection apparatus corresponding to the picking robot, the preset information collection position and the first image collection apparatus; determine an adjusted three-dimensional model of the three-dimensional model in a field of view of the second image collection apparatus according to the coordinate system corresponding relationship; and generate the composite image including the target item object corresponding to the target item according to the adjusted three-dimensional model and a preset background image representing a picking scenario of the picking robot.

In some alternative implementations of this embodiment, the above apparatus further includes: a determining unit (not shown), configured to determine a weight of the target item. The image generating unit 602 is further configured to generate the composite image including the target item object corresponding to the target item according to the adjusted three-dimensional model, the preset background image, the weight, preset resolution of the composite image and a parameter of the second image collection apparatus.

In some alternative implementations of this embodiment, the updating unit 604 is further configured to use a machine learning algorithm to train the target detection model through the training sample set to obtain the updated target detection model, in response to determining that a detection precision of the target detection model is less than a preset threshold.

In some alternative implementations of this embodiment, the above apparatus further includes: an obtaining unit (not shown), configured to perform a target detection on a subsequent input image through the updated target detection model to obtain a detection result; and a performing unit (not shown), configured to control the picking robot to perform a picking task according to the detection result.

In this embodiment, the constructing unit in the apparatus for updating a target detection model constructs the three-dimensional model of the target item according to the image data of the target item at the plurality of angles. The image generating unit generates the composite image including the target item object representing the target item according to the three-dimensional model. The sample generating unit uses the composite image as the sample image and the target item object as the tag to obtain the training sample to generate the training sample set. The updating unit trains the target detection model through the training sample set to obtain the updated target detection model. Here, the target detection model is used to represent the corresponding relationship between the input image and the detection result corresponding to the target item object in the input image. Accordingly, an apparatus automatically generating the training data and automatically updating the target detection model is provided, thereby improving the convenience of updating the target detection model and the accuracy of the detection result.

Referring to FIG. 7, FIG. 7 is a schematic structural diagram of a computer system 700 of a device (e.g., the devices 101, 102, 105 and 106 shown in FIG. 1) adapted to implement embodiments of the present disclosure. The device shown in FIG. 7 is merely an example, and should not bring any limitation to the functions and the scope of use of the embodiments of the present disclosure.

As shown in FIG. 7, the computer system 700 includes a processor (e.g., CPU, central processing unit) 701 that can perform a variety of appropriate actions and processes based on a program stored in a read only memory (ROM) 702 or loaded from a storage portion 708 into a random access memory (RAM) 703. In the RAM 703, various programs and data required for the operation of the system 700 may also be stored. The processor 701, the ROM 702, and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including a cathode ray tube (CRT), a liquid crystal display (LCD), and a speaker, etc.; a storage portion 708 including a hard disk, etc.; and a communication portion 709 including a network interface card, such as a LAN card, or a modem. The communication portion 709 performs communication processing via a network such as the Internet. A drive 710 is also connected to the I/O interface 705 as needed. A removable medium 711, such as a disk, a CD-ROM, a magnetic disk, or a semiconductor memory, may be mounted to the drive 710 as needed, so that computer programs read therefrom may be mounted to the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or be installed from the removable medium 711. The computer program, when executed by the processor 701, implements the above-mentioned functionalities as defined by the method of the present disclosure.

It should be noted that the computer readable medium in the present disclosure may be computer readable signal medium or computer readable storage medium or any combination of the above two. The computer readable storage medium of an embodiment of the present disclosure may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. The described units may also be provided in a processor. For example, the processor may be described as: a processor including a constructing unit, an image generating unit, a sample generating unit and an updating unit. Here, the names of these units do not in some cases constitute a limitation to such units themselves. For example, the updating unit may alternatively be described as "a unit for training the target detection model through the training sample set to obtain an updated target detection model."

In another aspect, the present disclosure further provides a computer readable medium. The computer readable medium may be the computer readable medium included in the device described in the above embodiments, or a standalone computer readable medium not assembled into the device. The above computer readable medium carries one or more programs. The one or more programs, when executed by the device, cause the computer device to: construct, according to image data of a target item at a plurality of angles, a three-dimensional model of the target item; generate a composite image including a target item object representing the target item according to the three-dimensional model; use the composite image as a sample image and the target item object as a tag to obtain a training sample to generate a training sample set; and train the target detection model through the training sample set to obtain an updated target detection model. Here, the target detection model is used to represent a corresponding relationship between an input image and a detection result corresponding to the target item object in the input image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for updating a target detection model, comprising:
   constructing, according to image data of a target item at a plurality of angles, a three-dimensional model of the target item;
   generating a composite image comprising a target item object representing the target item according to the three-dimensional model;
   using the composite image as a sample image and the target item object as a tag to obtain a training sample to generate a training sample set; and
   training the target detection model through the training sample set to obtain an updated target detection model, wherein the target detection model is used to represent a corresponding relationship between an input image and a detection result corresponding to the target item object in the input image, wherein the generating the composite image comprising the target item object representing the target item according to the three-dimensional model comprises:
      determining a coordinate system corresponding relationship among a second image collection apparatus disposed on a picking robot, a preset information collection position and a first image collection apparatus, wherein the image data of the target item is obtained by the first image collection apparatus when the target item is placed at the preset information collection position;
      determining an adjusted three-dimensional model of the three-dimensional model in a field of view of the second image collection apparatus disposed on the picking robot according to the coordinate system corresponding relationship; and
      generating the composite image comprising the target item object corresponding to the target item according to the adjusted three-dimensional model and a preset background image representing a picking scenario of the picking robot.

2. The method according to claim 1, wherein the constructing, according to image data of a target item at a plurality of angles, a three-dimensional model of the target item comprises:
   collecting, in a process of controlling the picking robot to perform the picking task for the target item according to the detection result of the target detection model for the target item object in the input image, two-dimensional image data and three-dimensional image data of the target item at the preset information collection position at the plurality of angles through the first image collection apparatus; and constructing the three-dimensional model of the target item according to the two-dimensional image data and the three-dimensional image data.

3. The method according to claim 1, wherein the method further comprises:
   determining a weight of the target item, and
   the generating the composite image comprising the target item object corresponding to the target item according to the adjusted three-dimensional model and a preset background image representing a picking scenario of the picking robot comprises:
      generating the composite image comprising the target item object corresponding to the target item according to the adjusted three-dimensional model, the preset background image, the weight, preset resolution of the composite image and a parameter of the second image collection apparatus.

4. The method according to claim 1, wherein the training the target detection model through the training sample set to obtain an updated target detection model comprises:
   using a machine learning algorithm to train the target detection model through the training sample set to obtain the updated target detection model, in response to determining that a detection precision of the target detection model is less than a preset threshold.

5. The method according to claim 1, further comprising:
   performing a target detection on a subsequent input image through the updated target detection model to obtain a detection result; and
   controlling the picking robot to perform a picking task according to the detection result.

6. An apparatus for updating a target detection model, comprising:
   one or more processors; and
   a storage apparatus, storing one or more programs,
   wherein the one or more programs, when executed by the one or more processors, cause the one or more processors to perform operations, the operations comprising:
      constructing, according to image data of a target item at a plurality of angles, a three-dimensional model of the target item;
      generating a composite image comprising a target item object representing the target item according to the three-dimensional model;
      using the composite image as a sample image and the target item object as a tag to obtain a training sample to generate a training sample set; and
      training the target detection model through the training sample set to obtain an updated target detection model, wherein the target detection model is used to represent a corresponding relationship between an input image and a detection result corresponding to the target item object in the input image, wherein the generating the composite image comprising the target item object representing the target item according to the three-dimensional model comprises:
         determining a coordinate system corresponding relationship among a second image collection apparatus disposed on a picking robot, a preset information collection position and a first image collection apparatus, wherein the image data of the target item is obtained by the first image collection apparatus when the target item is placed at the preset information collection position;
         determining an adjusted three-dimensional model of the three-dimensional model in a field of view of the second image collection apparatus disposed on the picking robot according to the coordinate system corresponding relationship; and generating the composite image comprising the target item object corresponding to the target item according to the adjusted three-dimensional model and a preset background image representing a picking scenario of the picking robot.

7. The apparatus according to claim 6, wherein the constructing, according to image data of a target item at a plurality of angles, a three-dimensional model of the target item comprises:

collecting, in a process of controlling the picking robot to perform the picking task for the target item according to the detection result of the target detection model for the target item object in the input image, two-dimensional image data and three-dimensional image data of the target item at the preset information collection position at the plurality of angles through the first image collection apparatus; and constructing the three-dimensional model of the target item according to the two-dimensional image data and the three-dimensional image data.

8. The apparatus according to claim 6, wherein the operations further comprise:

determining a weight of the target item, and the generating the composite image comprising the target item object corresponding to the target item according to the adjusted three-dimensional model and a preset background image representing a picking scenario of the picking robot comprises:

generating the composite image comprising the target item object corresponding to the target item according to the adjusted three-dimensional model, the preset background image, the weight, preset resolution of the composite image and a parameter of the second image collection apparatus.

9. The apparatus according to claim 6, wherein the training the target detection model through the training sample set to obtain an updated target detection model comprises:

using a machine learning algorithm to train the target detection model through the training sample set to obtain the updated target detection model, in response to determining that a detection precision of the target detection model is less than a preset threshold.

10. The apparatus according to claim 6, wherein the operations further comprise:

performing a target detection on a subsequent input image through the updated target detection model to obtain a detection result; and controlling the picking robot to perform a picking task according to the detection result.

11. A non-transitory computer readable medium, storing a computer program, wherein the program, when executed by a processor, causes the processor to perform operations, the operations comprising:

constructing, according to image data of a target item at a plurality of angles, a three-dimensional model of the target item;

generating a composite image comprising a target item object representing the target item according to the three-dimensional model;

using the composite image as a sample image and the target item object as a tag to obtain a training sample to generate a training sample set; and training the target detection model through the training sample set to obtain an updated target detection model, wherein the target detection model is used to represent a corresponding relationship between an input image and a detection result corresponding to the target item object in the input image, wherein the generating the composite image comprising the target item object representing the target item according to the three-dimensional model comprises:

determining a coordinate system corresponding relationship among a second image collection apparatus disposed on a picking robot, a preset information collection position and a first image collection apparatus, wherein the image data of the target item is obtained by the first image collection apparatus when the target item is placed at the preset information collection position;

determining an adjusted three-dimensional model of the three-dimensional model in a field of view of the second image collection apparatus disposed on the picking robot according to the coordinate system corresponding relationship; and generating the composite image comprising the target item object corresponding to the target item according to the adjusted three-dimensional model and a preset background image representing a picking scenario of the picking robot.

12. The non-transitory computer readable medium according to claim 11, wherein the constructing, according to image data of a target item at a plurality of angles, a three-dimensional model of the target item comprises:

collecting, in a process of controlling the picking robot to perform a picking task for the target item according to the detection result of the target detection model for the target item object in the input image, two-dimensional image data and three-dimensional image data of the target item at the preset information collection position at the plurality of angles through the first image collection apparatus; and constructing the three-dimensional model of the target item according to the two-dimensional image data and the three-dimensional image data.

13. The non-transitory computer readable medium according to claim 11, wherein the operations further comprise:

determining a weight of the target item, and the generating the composite image comprising the target item object corresponding to the target item according to the adjusted three-dimensional model and a preset background image representing a picking scenario of the picking robot comprises:

generating the composite image comprising the target item object corresponding to the target item according to the adjusted three-dimensional model, the preset background image, the weight, preset resolution of the composite image and a parameter of the second image collection apparatus.

14. The non-transitory computer readable medium according to claim 11, wherein the training the target detection model through the training sample set to obtain an updated target detection model comprises:

using a machine learning algorithm to train the target detection model through the training sample set to obtain the updated target detection model, in response to determining that a detection precision of the target detection model is less than a preset threshold.

15. The non-transitory computer readable medium according to claim 11, wherein the operations further comprise:

performing a target detection on a subsequent input image through the updated target detection model to obtain a detection result; and controlling the picking robot to perform a picking task according to the detection result.

* * * * *